Dec. 12, 1933.　　　　G. H. GREEN　　　　1,939,346
METHOD OF PRODUCING A CHAIN LINK AND THE LINK MADE BY SUCH A METHOD
Original Filed Oct. 2, 1929
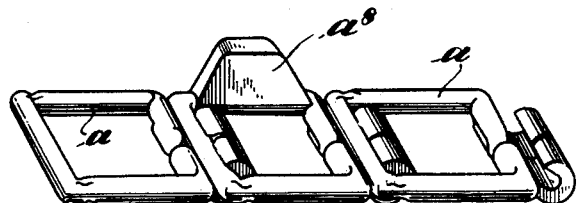
FIG. 1.
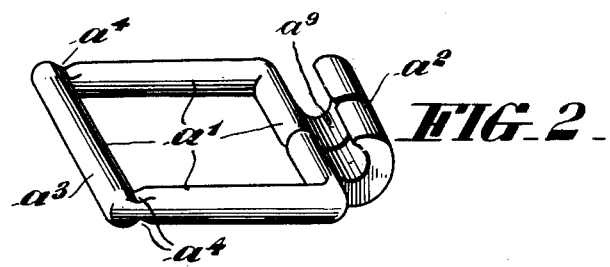
FIG. 2.
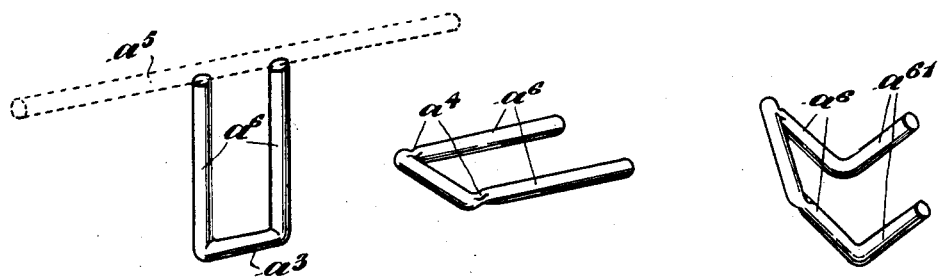
FIG. 3.
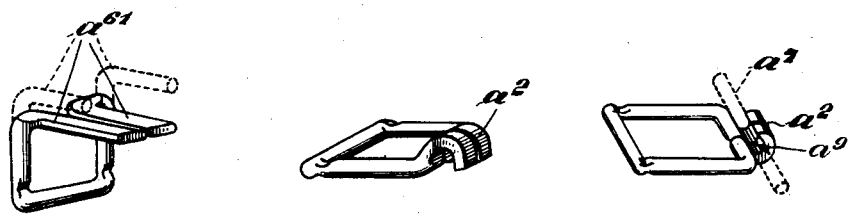
Inventor
George H. Green,
Barker & Collings
Attorneys Patented Dec. 12, 1933

1,939,346

UNITED STATES PATENT OFFICE 1,939,346

METHOD OF PRODUCING A CHAIN LINK AND THE LINK MADE BY SUCH A METHOD

George Henry Green, Knighton Fields, Leicester, England, assignor to The Economic Windings Company Limited, Leicester, England Original application October 2, 1929, Serial No. 396,796, and in Great Britain September 14, 1929. Divided and this application November 10, 1931. Serial No. 574,164

7 Claims. (Cl. 59—8)

This invention comprises an improved method of producing a chain link and the invention covered by this case is a division of an application filed by the applicant on 2nd October, 1929, under Serial No. 396,796.

The present invention has reference to a method of producing individual links of an articulated sprocket chain of the type described in the specification accompanying my concurrent application for patent numbered as above and to the links made by such method.

The present invention relates to manufacture of an articulated chain wholly or partly composed of duplicate links which are connected together in a readily removable manner and have a pivotal interlocking engagement one with another. Each of the said links is formed from a unitary portion of metal rod or wire and essentially comprises a rear bar portion, two side bar portions and front portions formed integral with the said side bars and constituting a composite connecting hook by means of which the link is adapted to be engaged with the rear bar of an adjacent link in the chain.

The object of the present invention is to provide an economical and effective method of producing a chain as above, and consists in bending a unitary portion of metal rod or wire into a U-shape, bending the end portions of the arms of the U out of the plane of the said U, bending the said arms towards each other at positions near the last-formed bends to cause the said end portions to be positioned side by side closely adjacent to each other, and bending the said end portions to form a composite hook.

In order that the invention may be more clearly understood reference will now be made to the accompanying drawing, wherein:—

Figure 1 illustrates in perspective three connected links of an articulated sprocket chain produced in accordance with the present invention.

Figure 2 is an enlarged perspective view of a single link of the said chain, and Figure 3 illustrates in perspective the different forms which the link shown in Figure 2 takes during the production thereof according to this invention.

The invention is illustrated and will be described in detail as applied to the production of the individual links of an articulated sprocket chain of the type described in my beforementioned concurrent patent application. This type of chain is particularly adapted for use as a timing chain in a knitting machine, but is not limited in application to such machines and may be used on agricultural and other machines.

The chain is composed of links $a$ each formed from a single length of wire bent and shaped to form a substantially rectangular main portion $a^1$ and an integral hooked connecting portion $a^2$ composed of the two extremities of the length of wire suitably bent and shaped as hereinafter described the hook being of a width closely approximating the width of the sprocket opening in the links, between the side bars thereof.

The hook $a^2$ of the link is adapted to be slid laterally over the rear bar $a^3$ of the rectangular portion of the next link to connect the chain links together, suitable laterally extending notches $a^4$ being provided in the side bars of each link. The hook $a^2$ of each link extends around more than half of the circumference of the rear link bar $a^3$ with which it engages, and the before-mentioned lateral notches $a^4$ are stamped in the side bars of the link to enable the said hook to be slid laterally over the said side bars and pivotally engage with the rear bar $a^3$ of the link.

In accordance with the present invention a chain link as above is formed from a single length of metal wire, preferably, steel wire of circular section, by a cold bending and pressing process, i. e., by bending and pressing the unitary portion of wire to the shape of the finished link without necessitating heating and softening of the wire.

The chain link herein described and illustrated has a rectangular eye or opening to receive the tooth of a sprocket wheel, such shape being necessary that there may be the front cross bar,— the bar carrying the coupling hook which is integral therewith—against which the sprocket tooth bears when in operation.

The production of the link may be carried out on any suitable known type of metal pressing machine and the method of production includes the following operations:—

Operation 1

The rod or wire preferably disposed horizontally, as indicated in dotted lines $a^5$ in Figure 3, is fed into a press (not shown) and a cutter descends to shear off the required length of rod. Immediately following the shearing of the rod, in the same stroke of the press, a tool engages with the central portion of the sheared length of rod, forces same downwardly into a stationary die and causes the said rod to assume a U-shape comprising the straight rear or connecting bar $a^3$ and two side arms $a^6$ extending at right angles from said bar.

Operation 2

For this operation the U-shaped length of rod is removed from the aforementioned die and is positioned horizontally in a U-shaped recess in another stationary die which has one or two V-shaped projections at one or both sides of the said die near that part of the recess adapted to receive the rear bar $a^3$ of the said rod, and a stamping die having a similar recess and one or more similar projections descends to stamp the notches $a^4$ in the rod.

Operation 3

Consists in horizontally positioning the U-shaped rod over a V-shaped notch in a stationary block, the sides of the notch being at right angles to one another, and forcing the said rod into recesses formed in the sloping faces of the said block by a descending V-shaped tool. The operation bends the arm $a^6$ at a position approximately midway in their length so that the end portions $a^{61}$ of the said arms extend at right angles to the remaining portions of the said arms.

Operation 4

Here the rod is gripped in the press with the arm portions $a^{61}$ disposed horizontally and the remaining arm portions $a^6$ extending downwardly therefrom, and descending and inwardly closing press tools engage the arm portions $a^{61}$ and $a^6$ just below the bends made in operation 3, press the said portions $a^{61}$ together, and close the link, a double crank bend being formed at the front shoulders of the link as shown. Simultaneously in this operation the end portions $a^{61}$ are flattened by the descending tools.

Operation 5

In this operation the partly formed link is held at the rear of a round-ended hardened steel projection around which the projecting end portions $a^{61}$ of the link are bent partly to form the composite hook portion $a^2$.

Operation 6

The link is finished in this operation by further pressing the end portions $a^{61}$ around a pin or spindle member $a^7$ positioned in the press, which pin member is of the same diameter as the rear bar $a^3$ of the link. This operation bends the ends of the hook portion $a^2$ so that they extend around more than half the circumference of the pin member $a^7$ and will, therefore, extend around more than half the circumference of the rear bar of an adjacent link in the chain and prevent the said links from being disengaged otherwise than by being slid laterally relatively to each other. The operation also definitely locates the curved inner surfaces $a^9$ of the hook correctly in relation to the other parts of the link and assures accurate alignment of the chain when the individual links are connected. It is also preferable during this final operation further to compress the metal of the end portions $a^{61}$ which constitute the hook $a^2$ and thereby increase the tensile strength of the said hook.

In order to prevent an undue amount of relative lateral movement between the connected links of the chain, the end arm portions $a^{61}$ of the rod should be flattened, either during operation 4, or in the final operation, so that the width across the composite hook is just less than the distance between the two side bars of the link. In large sizes of links, particularly links for the chains for use in agricultural machinery, it is necessary to use rod of comparatively large diameter to obtain this desired width across the hook, and in order that the hook should not be cumbersome and out of proportion to the other parts of the link, the diameter of the rear bar $a^3$ may be reduced by compressing the metal thereof and this may conveniently be effected during operations 1 and 2. For example, in operation 1 the downward pressure of the press tool may compress the rear bar to an oval section and in operation 2 pressure may be applied to the said bar in a direction at right angles to the pressure exerted in operation 1 again to compress the metal of said rear bar and cause it to assume a reduced circular section. The hook portion of the link which is adapted to accommodate the said bar can then be of normal proportion.

If desired, the two bent portions of the composite hook $a^2$ may be electrically or otherwise welded together at a subsequent operation in order further to strengthen the said hook.

It may also be desired to provide projecting cam or high link portions $a^8$ (see Figure 1) on certain of the links and such portions may be electrically welded thereon, preferably after the completion of the manufacture of the links, the said portions $a^8$ being suitably formed and shaped separate from the link.

The type of chain which is made according to the method that has been described—sprocket chain—is one that must possess strength, have accuracy of shape, and be capable of withstanding great tension and indefinite repetition of articulation, without weakening or deformation. The method described insures the production of such a chain in a relatively simple manner. It will be noted that the shaping of the individual links is accomplished by purely bending operations upon the metal rod from which the link is formed, without any twisting or torsional action thereupon, which twisting is very undesirable, as is apparent.

I claim:—

1. The method of producing a chain link of the type set forth, having a rectangular eye to receive a sprocket tooth and an integral hook of a width closely approximating the width of the eye for the sprocket tooth which consists in bending a unitary portion of metal rod or wire into a U-shape, bending the end portions of the arms of the U out of the plane of the said U, bending the said arms at right angles and towards each other at positions near the last formed bends to cause the said end portions to be positioned side by side closely adjacent to each other, and bending the said end portions to form a composite hook.

2. The method of producing a chain link such as described in claim 1, including as an additional step flattening the portions of the link that lie side by side preliminary to the formation of the composite hook.

3. The method of producing a chain link of the type set forth, having a rectangular eye and an integral hook of a width closely approximating the width of the said eye which consists in bending a unitary portion of metal rod or wire into a U shape, bending the end portions of the arms of the U out of the plane of the said U to extend at right angles to the remaining portions of said arms, bending the said arm portions at right angles and at positions between the first and last-formed bends to cause the said end portions to lie alongside each other, and bending the said end portions to form a composite hook.

4. As an additional operation in the method described in claim 3, compacting the curved projecting end portions of rod about a supporting and shaping member finally to shape and strengthen the hook.

5. The herein described method of forming a link for a detachably connected sprocket chain, having a rectangular eye and a forwardly projecting hook of a width closely approximating the width of the said rectangular eye, the hook being formed from the same piece of material as the other parts of the link which consists in taking a unitary portion of metal rod or wire, bending the said rod or wire into a U-shape having parallel arms of approximately equal length, the several parts of the U thus formed being in a single plane, bending the end portions of the said arms out of the plane of the U and at approximately right angles to the remaining portions of the arms, bending the said arms at right angles at positions adjacent to the last formed bends and towards each other to close the link and form a double crank bend at each side and at the forward part thereof, and curving the projecting end portions about a supporting and shaping member to form them into sections of a composite coupling hook adapted to extend around more than half of the circumference of a rear connecting bar of another link, including the stamping of notches at the rear extremity of the side bars of the link to enable the hook to be slid laterally thereover.

6. The method of forming, from metal rod or wire, a link for a sprocket chain, having a rectangular eye and a forwardly directed hook of a width closely approximating the width of the said eye adapted to hook onto the cross bar at the rear of the eye of an adjacent link, which consists in bending a piece of rod or wire to U-shape, bending up the ends of the arms of the U at right angles to the plane of said U, bending said arms towards each other, each through a right angle, at points closely behind the last formed bend whereby a rectangular eye is formed and the ends of the rod that project at right angles to the plane of the eye are brought to lie alongside each other, and finally bending said projecting ends forwardly to form a forwardly directed hook.

7. A sprocket chain link such as herein described formed from metal rod by bending operations without subjecting it to twisting or tortional action, when constructed according to the method stated in claim 6.

GEORGE HENRY GREEN.